(12) United States Patent
Moraski

(10) Patent No.: US 6,398,921 B1
(45) Date of Patent: Jun. 4, 2002

(54) PROCESS AND SYSTEM FOR WASTEWATER SOLIDS GASIFICATION AND VITRIFICATION

(75) Inventor: Dennis P. Moraski, Bellevue, WA (US)

(73) Assignee: MicroGas Corporation, Bellevue, WA (US)

( * ) Notice: Subject to any disclaimer, the term of this patent is extended or adjusted under 35 U.S.C. 154(b) by 0 days.

(21) Appl. No.: 08/404,747

(22) Filed: Mar. 15, 1995

(51) Int. Cl.$^7$ .............................. C02F 1/00; C07B 63/00
(52) U.S. Cl. ............................ 204/157.43; 204/157.15; 204/158.2; 204/158.21; 210/748; 588/900; 588/210; 588/212; 588/213; 588/219; 588/225; 588/227; 110/346
(58) Field of Search ................................ 588/210, 212, 588/213, 219, 225, 226, 227, 900; 110/346; 204/157.15, 157.43, 158.2, 158.21; 210/748

(56) References Cited

U.S. PATENT DOCUMENTS

| | | | |
|---|---|---|---|
| 3,523,076 A | 8/1970 | Goerz, Jr. et al. | 210/10 |
| 4,009,100 A | 2/1977 | Hess et al. | 210/14 |
| 4,060,588 A | 11/1977 | Mandelik | 423/242 |
| 4,096,065 A | 6/1978 | Bruch et al. | 210/188 |
| 4,105,460 A | 8/1978 | Gottlieb | 106/100 |
| 4,152,119 A | 5/1979 | Schulz | 44/1 D |
| 4,152,244 A | 5/1979 | Raichle et al. | 208/8 |
| 4,204,979 A | 5/1980 | Hobbs et al. | 252/416 |
| 4,213,857 A | 7/1980 | Ishida et al. | 210/6 |
| 4,261,795 A * | 4/1981 | Reilly | 202/118 |
| 4,308,807 A | 1/1982 | Stokes | 110/257 |
| 4,339,546 A | 7/1982 | Randalls | 518/704 |
| 4,353,713 A | 10/1982 | Cheng | 48/202 |
| 4,361,100 A | 11/1982 | Hinger | 110/238 |
| 4,398,476 A | 8/1983 | Suzuki et al. | 110/346 |
| 4,435,374 A * | 3/1984 | Helm, Jr. | 423/415 A |
| 4,437,417 A | 3/1984 | Roberts | 110/346 |
| 4,442,006 A | 4/1984 | Ishida et al. | 210/613 |
| 4,448,588 A | 5/1984 | Cheng | 48/99 |
| 4,476,876 A | 10/1984 | Uchiyama | 128/682 |
| 4,479,876 A | 10/1984 | Fuchs | 210/605 |
| 4,481,112 A | 11/1984 | Hitzel | 210/620 |
| 4,483,772 A | 11/1984 | Rolke et al. | 210/601 |
| 4,497,637 A * | 2/1985 | Purdy et al. | 48/111 |
| 4,507,127 A | 3/1985 | Hirose | 48/89 |
| 4,535,065 A | 8/1985 | Klein et al. | 502/21 |
| 4,583,470 A | 4/1986 | Hirose | 110/346 |

(List continued on next page.)

OTHER PUBLICATIONS

Gerrity, K.P., "Waste Conversion Technologies," Industrial Gas Technology Commercialization Center Technology and Market Assessment Committee Meeting (Oct. 1994).
"Sludge Treatment and Disposal," *Environmental Engineering* 22:44–52. No month or year indicated.
"Sludge Treatment," *Environmental Engineering* 10:16–24. No month or year indicated.

Primary Examiner—Dwayne C. Jones
Assistant Examiner—C. Delacroix-Muirheid
(74) Attorney, Agent, or Firm—Christensen O'Connor Johnson Kindness PLLC

(57) ABSTRACT

A process for gasifying solid organic matter from wastewater sludge involves dewatering the sludge to a solids content of at least 35% by weight using a combination of centrifugation, microwave heat exchange and screw press separation. The denatured solids are than at least partially pyrolyzed by passing through a heated inclined screw auger. The pyrolysis solids, tars and gases are then gasified by exposure to a high intensity microwave field. Resulting fuel gas and char from the gasification are then separated, with the char then being combusted in a cyclonic char burner to produce vitrified ash and process heat. Fuel gases are cleaned and then burned in internal combustion engines for the generation of electricity and process heat.

27 Claims, 3 Drawing Sheets

U.S. PATENT DOCUMENTS

| | | | |
|---|---|---|---|
| 4,585,463 A | 4/1986 | Hirose | 48/111 |
| 4,597,771 A | 7/1986 | Cheng | 48/77 |
| 4,606,722 A | 8/1986 | Olauson | 432/14 |
| 4,610,695 A | 9/1986 | Crespin et al. | 44/51 |
| 4,759,300 A | 7/1988 | Hansen et al. | 110/229 |
| 4,793,855 A | 12/1988 | Hauk | 75/26 |
| 4,828,577 A | 5/1989 | Markham, Jr. et al. | 44/589 |
| 4,929,254 A | 5/1990 | Kooiman et al. | 48/76 |
| 4,933,086 A | 6/1990 | McMahon et al. | 210/603 |
| 4,937,411 A * | 6/1990 | Suzuki et al. | 219/10.55 R |
| 4,983,296 A | 1/1991 | McMahon et al. | 210/603 |
| 5,028,241 A | 7/1991 | Kooiman et al. | 48/87 |
| 5,064,523 A | 11/1991 | Kretschmar et al. | 208/112 |
| 5,084,140 A * | 1/1992 | Holland | 201/19 |
| 5,158,037 A | 10/1992 | Engelbart | 119/3 |
| 5,188,739 A | 2/1993 | Khan et al. | 210/770 |
| 5,188,740 A | 2/1993 | Khan | 210/770 |
| 5,188,741 A | 2/1993 | Zang et al. | 210/774 |
| 5,211,723 A | 5/1993 | Khan | 48/197 |
| 5,211,724 A | 5/1993 | Khan et al. | 48/197 |
| 5,217,625 A | 6/1993 | Khan et al. | 210/761 |
| 5,230,211 A | 7/1993 | McMahon et al. | 60/39.02 |
| 5,234,468 A | 8/1993 | Khan | 48/197 |
| 5,234,469 A | 8/1993 | Khan et al. | 48/197 |
| 5,264,009 A | 11/1993 | Khan | 48/197 |
| 5,266,085 A | 11/1993 | McMahon et al. | 48/197 |
| 5,273,556 A | 12/1993 | McMahon et al. | 48/197 |
| 5,279,234 A * | 1/1994 | Bender et al. | 110/210 |
| 5,292,442 A | 3/1994 | Khan et al. | 210/770 |
| 5,293,696 A | 3/1994 | Schmidt et al. | 34/76 |
| 5,397,551 A * | 3/1995 | Won Sam | 422/186 |

\* cited by examiner

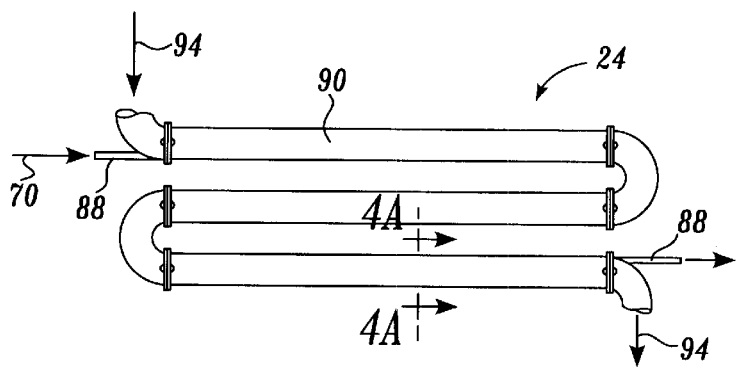
Fig. 4.
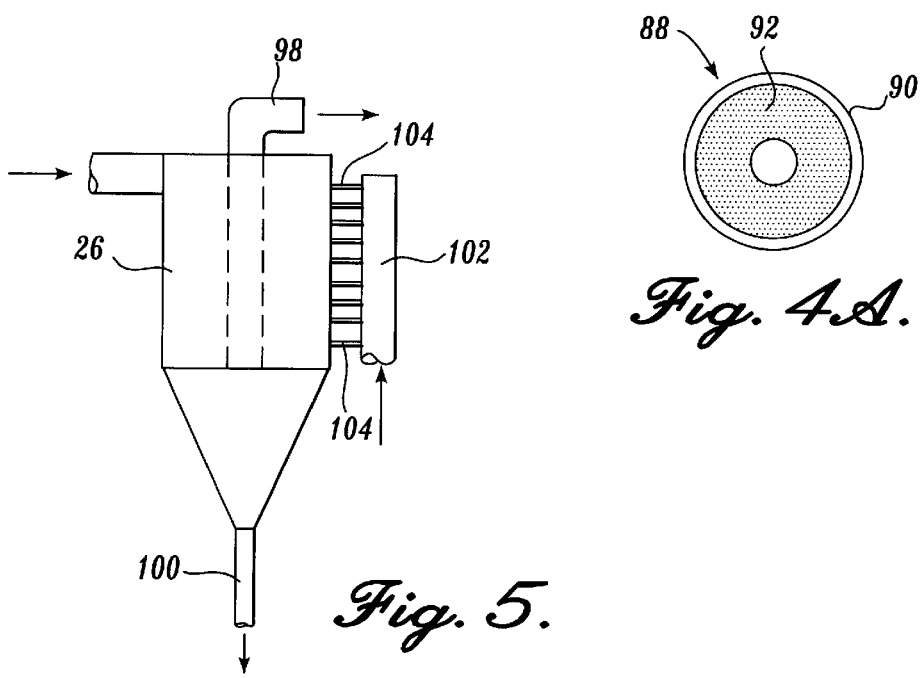
Fig. 4A.
Fig. 5.
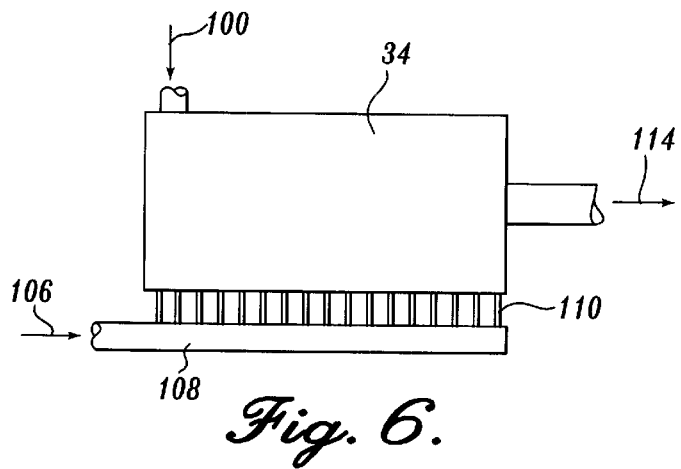
Fig. 6.

PROCESS AND SYSTEM FOR WASTEWATER SOLIDS GASIFICATION AND VITRIFICATION

FIELD OF THE INVENTION

The present invention relates to the gasification of organic matter, and more particularly to the gasification of organic solids recovered from wastewater sludge.

BACKGROUND OF THE INVENTION

Industrial and agricultural processes and municipalities produce large quantities of organic wastes, which may be either relatively dry solids or may be contained in wastewater streams. Historical waste management techniques have included landfill storage of solid wastes and marine disposal of wastewater streams, resulting in severe environmental impact. Additionally, the energy that is stored within such organic materials is not utilized.

There has thus arisen a desire to develop techniques for reducing waste volume while recovering energy from organic waste matter. Processes have been developed to incinerate solid wastes and dewatered wastewater streams. Incineration of municipal sludge has been fairly widespread, but more recently has fallen into disfavor. There is little or no beneficial reuse of the energy in wastes with incineration, and in many cases, a great deal of auxiliary fuel is consumed. In addition, hazardous emissions, such as dioxins and heavy metal compounds, may be produced by incineration Some conventional gasification processes have addressed difficulties in gasifying dewatered waste solids from wastewater streams by admixing easily combusted, concentrated-energy fuels, such as coal fines, to the waste material. While enhancing the ability to combust the wastes, the requirement of adding coal further reduces overall process efficiency.

As an alternative to conventional gasification techniques, many municipalities treat wastewater and sewage streams to produce a sludge that is suitable for use as an agricultural soil amendment. However, the costs of transporting the sludge from the municipal generation site to agricultural sites, and of spreading the sludge on fields, is high.

SUMMARY OF THE INVENTION

The process of the present invention provides a method for gasifying organic waste materials, such as aqueous sludge containing organic solids. The sludge is first dewatered to a solids content of at least 35% to 65%, and preferably 50% by weight. In a preferred embodiment of the invention, dewatering is carried out by centrifugation, followed by heating in a microwave heat exchanger, and then further dewatering by passing the sludge through a screw press. The dewatered solids are then at least partially pyrolyzed, producing gases, tars, char and unpyrolyzed solids. These pyrolysis products are then further gasified by anoxically exposing the products to high intensity microwave radiation in a microwave gasification reactor, producing carbon containing fuel gases and char. The fuel gases are then separated from the char. The fuel gases are cleaned, compressed and combusted to generate electricity and process heat by a cogeneration process. When the char is burned, the inorganic portion is liquified and quenched to produce vitrified ash. In a preferred embodiment of the invention, char combustion and ash vitrification is carried out in a cyclonic furnace. The vitrified ash may be used as an inert additive for manufacture of products such as roofing tiles, paving asphalt, cement bricks or road concrete.

The present invention thus provides a highly efficient process and system that concentrates solids in wastewater sludges, greatly reduces the volume of those solids, and recovers a significant portion of the energy stored in the waste. The use of microwave gasification is, found to be a highly efficient method of gasification.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 4 provides a schematic representation of the microwave gasification reactor of the system of FIG. 1;

FIG. 4A provides a schematic cross-sectional representation of the reactor of FIG. 4, taken substantially along section line A—A;

FIG. 5 provides a schematic representation of the centrifugal solid/gas separator of the system of FIG. 1; and FIG. 6 provides a schematic representation of the cyclonic char burner of the system of FIG. 1.

DETAILED DESCRIPTION OF THE PREFERRED EMBODIMENT

Figure 1:
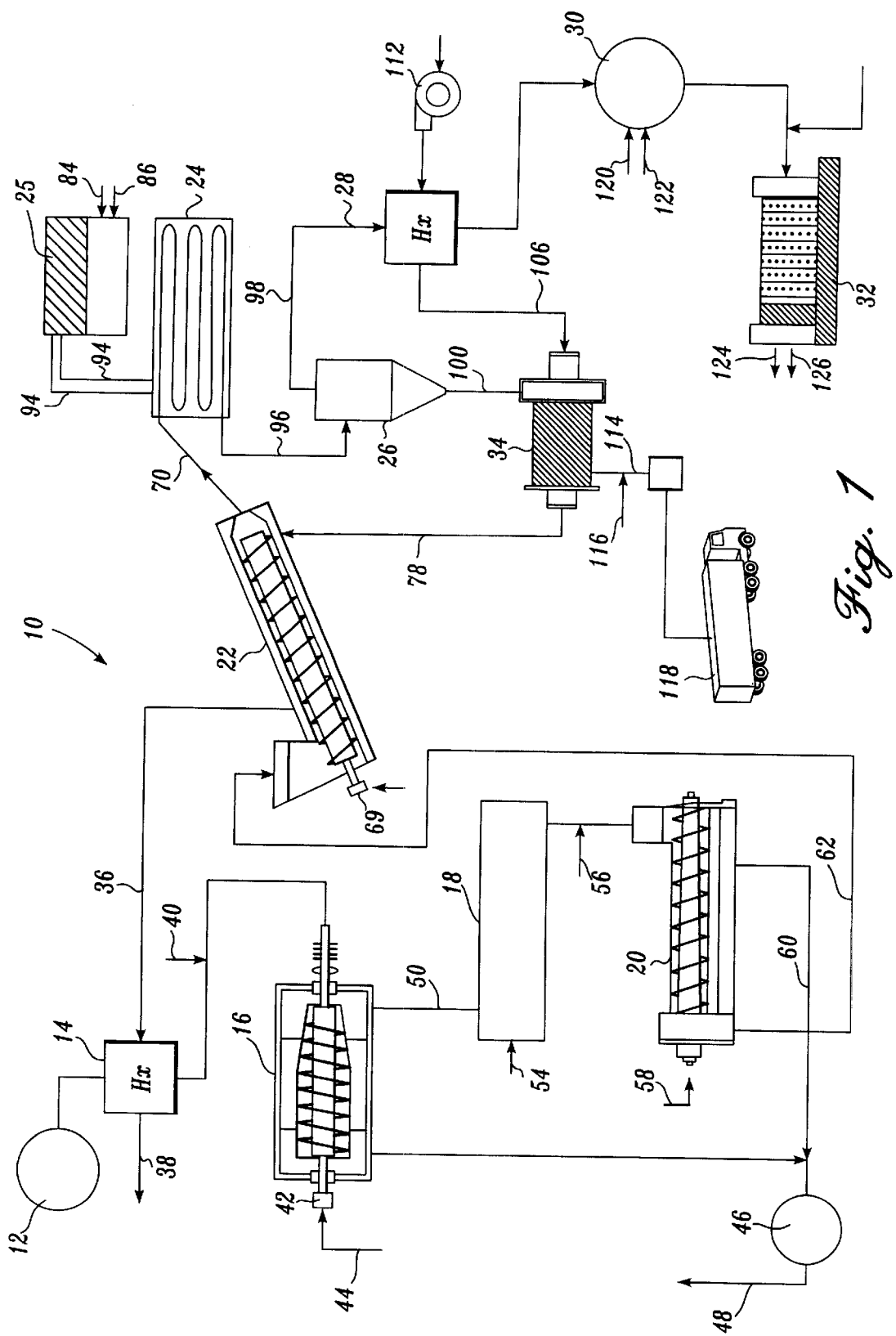
FIG. 1 provides a schematic diagram of a wastewater gasification system constructed to operate in accordance with the process of the present invention.

A wastewater sludge gasification system 10 constructed to operate in accordance with the process of the present invention is shown schematically in FIG. 1. Raw or digested sludge from a waste treatment plant 12 is preheated in a heat exchanger 14 using gasification process heat. The preheated stream then passes through a centrifuge 16, which dewaters the sludge to a solids content of approximately 30%. The dewatered sludge then passes through a microwave heat exchanger 18, which increases the temperature of the sludge to aid further dewatering. The heated sludge then passes through a screw press 20, which further dewaters the sludge to a solids content of at least 35% to 65%, and preferably 50%. A solids content of approximately 50% is believed to be optimum, to avoid the presence of water in excess of what will be required subsequently in the gas-water shift reaction, while also avoiding the energy requirement of making the sludge drier than 50%. Mechanical dewatering of the sludge to a solids content of 35% to 65%, and preferably to 50%, is typically preferred over thermal dewatering, but for some sludges, thermal dewatering may be suitable for practicing the present invention. The dewatered solids then pass into an auger pyrolysis reactor 22, which evaporates off water from the solids and partially volatilizes the solids, producing char, gas, tar and some unreacted solids.

These pyrolysis products then pass into a microwave gasification reactor 24, which is coupled to a microwave generator 25. The non-volatilized solids and tar are substantially gasified, in the absence of air or other oxygen source, in the microwave gasification reactor 24. The resulting char and fuel gases are then separated in a cyclone 26. Fuel gases are discharged from the cyclone 26 and pass through a heat exchanger 28, where they preheat incoming process air. The fuel gases are then cleaned by stripping off contaminants, and compressed in a gas treatment unit 30. This cleaned fuel gas is then burned in an internal combustion engine 32 to produce process heat and electricity. As an alternative to the internal combustion engine 32, a turbine, fuel cell or other prime mover may be utilized to recover energy from the fuel gas. Char from the cyclone 26 is combusted in a cyclonic char burner 34, which is operated in a slagging mode to produce a vitrified ash. The hot combustion air from the cyclonic char burner 34 provides the heat of pyrolysis for the reactor 22.

The operation of the system 10 in accordance with the present invention will now be described in farther detail. The system 10 is designed to accommodate treatment of wastewater sludges containing organic solids, biomass and solid organic fuels such as coal and lignite. The centrifuge 16, microwave heat exchanger 18 and screw press 20 are used to remove water from such aqueous streams. However, the system 10 may be adapted for use in treating drier waste streams, such as agricultural wastes, which may not require some or all of the dewatering steps. Given this understanding that the dewatering steps can be eliminated if unnecessary, each of the dewatering systems shall now be described.

Thickened municipal sludge produced from conventional sewage treatment plants typically contains 4 to 8% solids by weight in water. This raw digested sludge is supplied from the waste treatment plant 12 to the heat exchanger 14 at an ambient temperature, i.e., approximately 60° F. The heat exchanger 14 transfers heat from a process gas stream 36 that exits the pyrolysis reactor 22. While this process gas stream has given off the majority of its heat to the pyrolysis reactor 22, sufficient heat remains to raise the temperature of the inlet sludge from ambient temperature to approximately 100–110° F. Polymer flocculating agents are then added to the prewarmed sludge stream through conduit 40, as is well known by those of ordinary skill in the art, to aid in the dewatering process.

This prewarmed, treated sludge stream is then fed to a conventional centrifuge 16. The centrifuge 16 is powered by a motor 42 which receives plant electricity, as indicated by supply line 44. The liquid filtrate from the centrifuge 16 flows to a filtrate storage tank 46, for subsequent return to the wastewater treatment plant as indicated by process stream 48. The solids cake produced by the centrifuge 16 contains about 30% solids by weight.

Figure 2:
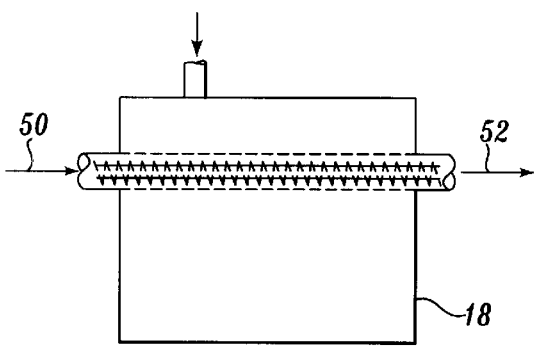
FIG. 2 provides a schematic illustration of the microwave heat exchanger used in the system of FIG. 1.

This partially dewatered sludge stream 50 is then supplied to the microwave heat exchanger 18. The microwave heat exchanger 18 includes a sealed screw conveyor 52, as shown in the illustration of FIG. 2. The heat exchanger 18 also includes a microwave generator that generates microwaves to which the solids passing through the screw conveyor 52 are exposed, raising the temperature of the solids to at least 120° F. The nominal frequency of the microwaves to which the sludge is exposed in the microwave heat exchanger 18 is from 1.0 to 10,000 Mhz, with the preferred range being from 915 to 2,450 Mhz. Suitable microwave field intensities are less than 150 watts per cubic foot. Additionally the microwave power may be applied in a pulsed mode, turning on and off alternately in periods from 0.001 to 1 second. The microwave heat exchanger is powered by electricity, as noted by inlet line 54.

This heat conditioning of the sludge is desired to increase the effectiveness of subsequent dewatering operations. Organic matter in the sludge stream 50 couples well with microwave energy, because the main components of the sludge are water and carbon, which are both excellent receptors of microwave energy. Additionally, the indirect heat exchange provided by the microwave heat exchanger 18 allows a compact design which minimizes heat exchange surfaces.

The system 10 is suitable for use with both raw and digested sludges. Such sludges contain microbiological cells which carry water that is difficult to extract from the sludge. It is believed that the microwave energy may be preferentially attracted to these microbiological cells. Thus heating by microwave in the microwave heat exchanger 18 facilitates removal of a portion of the water content of the sludge that is otherwise most difficult to remove.

The sludge exiting the microwave heat exchanger 18 contains approximately 30% solids by weight, and has been raised to a temperature of at least 120° F. An acid, such as sulfuric acid, may be added to the stream as indicated by supply line 56, to lower the pH to a value between 4.0 and 5.0, and preferably 4.5, to aid in further dewatering. This microwave heated, partially dewatered stream is then supplied to the screw press 20, which is electrically powered as indicated by supply line 58. The screw press 20 removes further water, producing an aqueous filtrate, as indicated by process stream 60, which is fed to the filtrate storage tank 46 for return to the wastewater plant. The solid cake produced by the screw press 20, indicated by process stream 62, has a solids content of at least 35% by weight, and preferably 50% solids by weight. The dewatered waste solids are now ready for pyrolysis and gasification.

The system 10 has been described thus far utilizing a combination of the centrifuge 16, the microwave heat exchanger 18 and the screw press 20 to dewater the solids from the initial 4 to 8% by weight solids content to the final at least 35%, and preferably 50%, solids content. This combination of dewatering equipment, including in particular the use of a microwave heat exchanger to heat the sludge and free bound water prior to mechanical dewatering, is preferred for dewatering wastewater streams. However, it should be readily apparent to those of skill in the art that other dewatering equipment, such as filter presses or multiple centrifuges, could instead be utilized. In each case, the dewatering devices utilized are relatively low energy consumption devices. Further, for some sludges it may be desirable to instead use thermal dewatering, i.e., drying, to augment or in place of mechanical dewatering.

Figure 3:
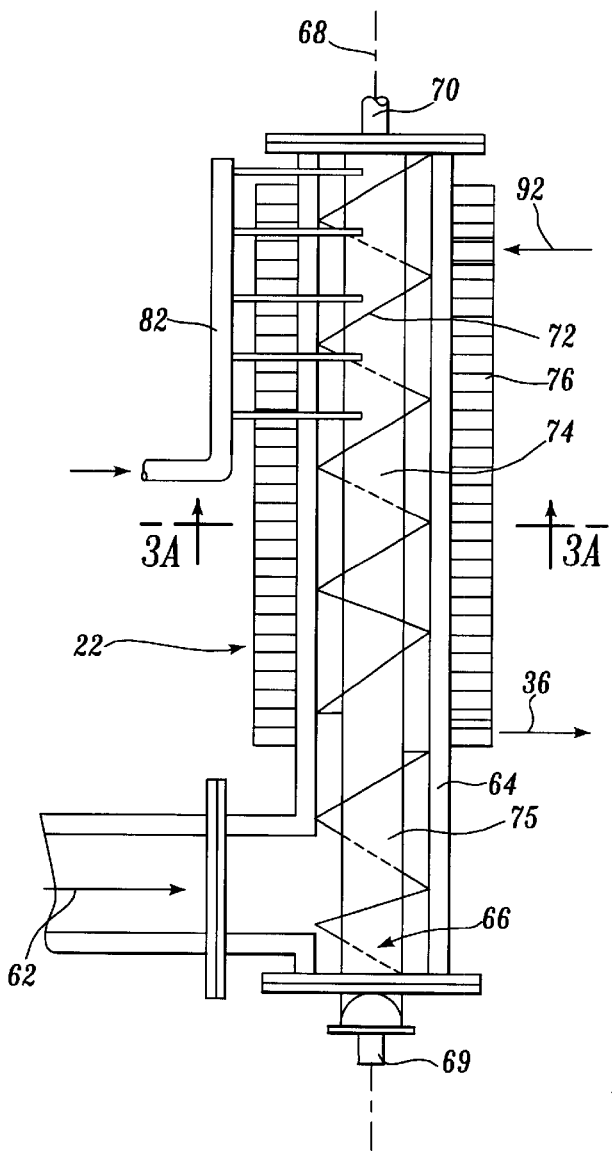
FIG. 3 provides a schematic illustration of the auger pyrolysis reactor used in the system of FIG. 1.
Figure 3A:
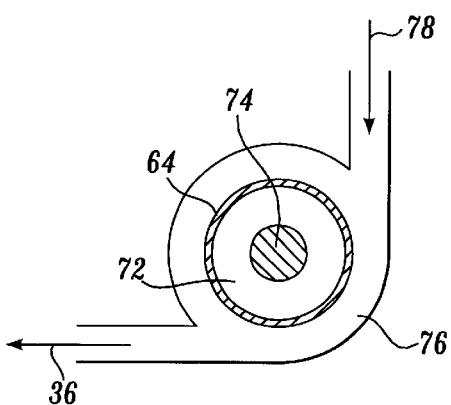
FIG. 3A provides a schematic cross sectional representation of the auger pyrolysis reactor of FIG. 3, taken substantially along section line A—A.

The dewatered solids from the screw press, indicated by process stream 62, are then transferred by sealed screw conveyors (not shown) to the pyrolysis reactor 22. The pyrolysis reactor 22 is constructed from a sealed screw conveyor having a housing 64 in which a rotating auger 66 is coaxially mounted, as shown in FIGS. 3 and 3A. The auger 66 and cylindrical casing 64 cooperatively define a longitudinal axis 68, about which the screw auger 66 is rotated by an hydraulic motor 69. The auger 66 includes a spiral flight 72 that is secured to a central shaft 74. The flight 72 and shaft 74 are sized such that the outer diameter of the spiral defined by the flight 72 closely matches the internal diameter of the casing 64. Rather than using a single large pyrolysis reactor 22, it may be desirable to use multiple smaller auger pyrolysis reactors 22.

The auger 66 distributes the biomass solids being conveyed through the pyrolysis reactor 22 into a thin agitated bed, having a depth of approximately 0.2 to 4 inches at any location, which enhances heat transfer to the biomass solids. Rotation of the flight 72 during operation provides constant cleaning of the inside heat exchange surface of the casing 64, preventing build up of scale that would inhibit heat transfer. The arrangement has many beneficial aspects of a thin film boiler where the vaporizing of the gases creates a great deal of turbulence which acts to remove boundary layers and enhances heat transfer.

The pyrolysis reactor 22, is operational in any disposition, from horizontal to vertical, but preferably is positioned on an incline, such that the biomass solids exit the reactor 22 in an outlet stream 70 that is at a higher elevation than the inlet stream 62. Preferably, the pyrolysis reactor 22 is vertically inclined such that the longitudinal axis 68 defines an angle relative to a horizontal plane of from 20 to 70°, and most preferably from 30 to 45°. This vertical orientation causes the conveyed biomass to compact under its own weight to form a plug near the inlet end of the reactor 22, which substantially prevents pyrolysis gases from escaping to the atmosphere. To enhance formation of this plug, it is preferred that a short section of the flight 72 be removed from the auger 66, as indicated at lower segment 75 of the auger 66 in FIG. 3. This segment 75 enables the formation of a solid, moving pressure plug around the shaft 74 to block gas leakage.

The casing 64 of the reactor 22 is encased in a spiral heat exchanger jacket 76, which is composed of many fins to enhance heat transfer. The heat exchanger jacket 76 receives hot combustion gases from the char burner 34, which provides the heat for water evaporation and pyrolysis to the conveyed biomass solids. The combustion gases enter through an inlet stream 78, adjacent the outlet of the pyrolysis reactor 22, flowing around the outside of the reactor casing 64 in a direction counter current to the flow of the conveyed biomass solids, and exiting in an outlet stream 36 from the heat exchanger jacket 76, adjacent the inlet end of the reactor 22. The combustion gases enter in stream 78 at a temperature of approximately 1800° F., and cool as they transfer heat to the conveyed biomass solids, leaving in the outlet stream 36 at a temperature of approximately 1,000° F. or less.

The conveyed biomass solids enter the reactor 22 in stream 62 at a temperature of approximately 120° F. or less, and are heated to a final temperature at the exit stream 70 of at least 600 to less than or equal to 1200° F., and preferably approaching 1200° F. The maximum outlet temperature for the conveyed biomass solids of 1200° F. is desired in order to confine operation of the reactor 22 to only drying and pyrolysis, and to not promote the more complex gasification reactions which take place subsequently in the microwave gasifier 24.

Pyrolysis takes place in the absence of oxygen, i.e., anoxically, and thus no air or oxygen is supplied to the reactor 22. However, in order to allow variation in the operation of the pyrolysis reactor 22 and precise control of the reactions occurring therein, an option is provided to allow the introduction of air, steam or oxygen to an outlet portion of the reactor 22 through an air injector 82. For example, if it is found necessary in dealing with a particular waste to further elevate the temperature of the exit stream from the reactor 22, a controlled quantity of air can be tangentially injected into the pyrolysis product stream to enable controlled combustion of some of the products. However, it is not believed that this addition of oxygen is either necessary or desirable in most instances. Rather, it is preferred for sludge gasification processes that the pyrolysis reactor 22 be maintained in an anoxic condition throughout its length.

The pyrolysis reactor 22 provides for fast pyrolysis that occurs during a short residence time. In particular, the biomass solids are conveyed through the pyrolysis reactor 22 in approximately 0.1 to 5 seconds, rapidly being heated to the ultimate temperature of 600 to 1200° F. as the material travels along the length of the reactor 22. The pyrolysis unit has a very high energy density. This high rate of heat transfer is a result of: (a) the relatively thin (0.2 to 4 inches) agitated solids bed created by the auger 66; (b) the high temperature differential between the solid biomass feed and the outer heat exchange surface of the casing 64, which ranges from approximately 600° F. at the outlet end of the reactor 22 to approximately 1000° F. at the inlet end of the reactor 22; (c) the constant contact of the conveyed biomass solids with the inner heat exchange surface of the casing 64; and (d) the absence of recycled gas or solids through the pyrolysis reactor 22.

The pyrolysis reactor 22 results in both drying and pyrolysis of the solid materials being conveyed through the reactor. Initially, gas expansion from vaporization of water within the reactor 22 results in a significant increase in gas pressure, which causes the pyrolysis gases to move through and exit the reactor 22 via the outlet stream 70. The gas flow is self generated, and is driven by volatilization of the water and organic matter. Pressure within the pyrolysis reactor 22 is limited to less than 1 psi. The size of the duct handling the outlet stream 70 from the pyrolysis reactor 22 is selected to achieve a downstream gas velocity of 10 to 75 feet per second so that the solid particles can become entrained in the gas flow.

Once the aqueous portion of the conveyed biomass solids is vaporized, the organic volatiles are then vaporized at temperatures of from 200 to 1200° F. as the solid materials continue to move along the conveyor 22, absorbing heat from the heat exchanger 76. The conveyed solids tend to compactly fill the reactor 22 because of the vertical incline of the reactor, thus providing constant contact between the conveyed solids and the heated casing 64.

The pyrolysis reactor 22 results in volatilization of from 50% to 95%, and most often 50% to 75%, of the original organic solids entering the reactor 22. This percentage varies depending on the amount of fixed carbon in the feed and the selected process conditions of the reactor 22.

The above noted operating conditions for the pyrolysis reactor 22, i.e., short residence time and high temperatures, are selected to yield the highest portion of gas and the lowest portion of tar and char. The pyrolysis products leaving in stream 70 from the pyrolysis reactor 22 duly consist of approximately 50% water vapor, 35% gas, including volatilized tars but mainly consisting of carbon monoxide and carbon dioxide, and 15% char and unvaporized solids.

These pyrolysis products then flow to the microwave gasifier 24, which is designed and operated to add precise amounts of heat directly to the unvaporized solids and char using a high-density microwave field. This enables the production of fuel gases having the lowest tar content and highest energy possible. The microwave gasification reactor 24 allows a high degree of control over the gasification reactions. The reactions occurring during gasification are well known, and represent a conversion of carbon solids, water vapor, tars and low grade fuel gases to cleaner and more useful fuel gas. The primary reactions occurring during gasification are as follows:

$$CO+H_2O=CO_2+H_2$$

$$C+2H_2=CH_4$$

$$C+H_2O=CO+H_2$$

$$C + CO_2 = 2CO$$

$$C + O_2 = CO_2$$

The microwave generator 25 that supplies microwaves to the microwave reactor 24 generates a high density microwave field, and is supplied with electricity, indicated by supply line 84 and cooling water, represented by supply line 86. Suitable microwave field densities for practice of the present invention are from 1,000 to 50,000 watts per cubic foot. This is substantially greater than typical microwave field densities used in residential, commercial and industrial microwave ovens, which typically vary from less than 100 to 1,000 watts per cubic foot. The high density microwave field used in the present invention provides precise temperature control for the gasification reactions, and introduces sufficient energy to raise the temperature of the reaction stream from the pyrolysis product stream 70 inlet temperature of approximately 1200° F., to a gasification temperature of 1800 to 2200° F.

Gasification is primarily an endothermic process, and the microwave gasifier 24 enables the process to be carried out without the addition of air or oxygen, thus avoiding the presence of nitrogen resulting from the introduction of air, and also avoiding combustion reactions that would alter the energy content of the fuel gases produced during gasification. Because pyrolysis in the pyrolysis reactor 22 is carried out immediately prior to the pyrolysis products being supplied to the microwave gasification reactor 24, microwave energy is ideally suited for gasification, because of rapid heat delivery. This is important because the pyrolyzed carbon is highly reactive only for a very short period of time. The microwave gasifier 24 enables reaction of an atmosphere consisting of water vapor, carbon dioxide and hydrogen with the highly reactive pyrolysis carbon at the desired temperature of 1800° to 2200° F. to maximize fuel gas production.

The microwave gasification reactor 24 is further illustrated in FIGS. 4 and 5A. Pyrolysis products from stream 70 are conveyed through a tubular reaction vessel 88, which is preferably configured for multiple passes to provide a sufficiently long duration of exposure to the microwave energy while minimizing the size of the reactor 24. As shown in FIG. 4A, the reactor vessel 88 is formed within a surrounding wave guide 90. A refractory material 92 is formed as a layer on the inside of the wave guide 90, leaving a passage through the center of the refractory through which solids and gases flow. While the cross section of the wave guide 90 is illustrated as cylindrical, other configurations for the wave guide, such as a rectangular or square configuration, are possible. Microwave radiation generated by the microwave generator 25 passes from the generator 25 through the wave guide 90, as indicated by supply lines 94 in FIGS. 1 and 4.

The wave guide 90 is designed to produce a maximum energy density at its cross-sectional center, thus quickly heating the char and other solids passing through the reactor vessel 88. The reactor vessel 88 preferably has a diameter of 1–4 inches. The reactor vessel 88 may contain baffles, vanes, or other structures to promote controlled continual mixing of the solids and gases within the vessel 88 as they travel along its length.

Fuel gases and char exit the microwave gasification reactor 24 in stream 96, and flow to the cyclone 26. The cyclone 26 is shown in FIG. 5, and acts to separate the fuel gases, which exits the separator in stream 98, from the char, which exits from the bottom of the cyclone 26 in stream 100. This cyclone 26 provides the option of adding air or oxygen to the swirling char and gases if necessary for any reason to raise the product stream temperature by enabling a controlled level of combustion within the separator chamber. An air manifold 102 is provided for this purpose, and includes a vertical series of jets 104 that can be employed to inject streams of air, oxygen or steam tangentially into the cyclone chamber for further gasification. However, it is not believed that this will be necessary in most instances.

Separated char is drawn from the bottom of the cyclone 26, and is fed to the cyclonic char burner 34, illustrated in FIG. 6. The cyclonic char burner 34 is supplied with air or oxygen through an inlet line 106, which passes into an air manifold 108 that provides for the injection of air into the combustion chamber in spaced tangential streams through jets 110. The combustion air flowing through inlet line 106 is supplied by a blower 112, and is preheated in the heat exchanger 28 by the fuel gases flowing from the separator 26 through line 98.

The cyclonic char burner 34 is a high-temperature device in which high-velocity, swirling combustion air is used to completely combust any remaining char. The ash is separated from the carbon in liquid form on the cyclone combuster walls, and flows by gravity towards a port located at the down stream end of the cyclone chamber through stream 114. This ash is quenched with water from line 116. The quenched, vitrified ash can be transported, as represented by transport 118, for use as a raw material in manufacturing processes such as the production of roofing tiles and paving asphalt. The hot combustion gases exit the char burner 34 with a temperature of approximately 1800° F. in stream 78, and are supplied to the heat exchange jacket 76 of the pyrolysis reactor 22, as previously described.

Fuel gas exits the separator 26 and leaves in the stream 98, passing through the heat exchanger 28 to heat the combustion air from blower 112 to feed the char burner 34. After passing through the heat exchanger 28, the fuel gas is sent to the gas treatment unit 30, which is supplied with water through line 120 and electricity through line 122. In the treatment unit 30, the gas is further cooled to approximately 150° F., and is cleaned of any remaining particulates and tars using conventional techniques, such as electrostatic ion precipitation and/or liquid extraction. This clean fuel gas is then compressed to approximately 100 psig and sent to a tank (not shown) for limited surge storage. The fuel gas is then regulated down to the inlet pressure required for the internal combustion engine 32. The heating value of the fuel gas may be augmented by the addition of approximately 20% by weight natural gas, in order to boost the heating value of the resulting mixture to approximately 500 BTUs per cubic foot. This mixed fuel gas is then combusted in the internal combustion chamber 32 to produce electricity, as indicated by line 124, and processed heat, as indicated by line 126, as desired.

The internal combustion engine 32, which represents the utilization of cogeneration in the system 10, burns the fuel gas to produce both electricity and heat, thereby increasing the overall efficiency of energy usage. The electrical energy produced can either be consumed by the system 10 or sold to a local utility. The heat produced by the cogeneration process of the engine 32 can be used in the system 10 or other plant areas. In some cases the heat in line 126 is of sufficient temperature and volume to warrant additional electrical cogeneration with a boiler and steam turbine, thus raising the overall conversion efficiency to high value electricity.

Start-up of the system 10 requires the use of additional make up fuel, such as liquified petroleum gas, oil or natural gas, to be fed into the burner 34 to achieve the desired temperature in the pyrolysis unit 22. Once the systems are up to operating temperature, the use of make up fuel is terminated.

A suitable embodiment of the system 10 is able to treat an input of combined raw primary and secondary waste water sludge having a solids content of 6% at a flow rate of 10,000 pounds per hour of solids and 157,000 pounds per hour of water. At these flow rates, the process, once reaching equilibrium, produces 15,000 pounds per hour of low heating value gas, 1000 pounds per hour of ash, and 150,000 pounds per hour of processed water and filtrate. The low heating value gas is blended with natural gas at the rate of 14,000 scfh. When used in the internal combustion engine-driven cogeneration unit, the system produces recoverable heat and 4,900 kW of electricity.

While the preferred embodiment of the invention has been illustrated and described, it will be appreciated that various changes can be made therein without departing from the spirit and scope of the invention. Thus it is intended that the scope of letters patent granted hereon be limited only by the definitions contained in the appended claims.

The embodiments of the invention in which an exclusive property or privilege is claimed are defined as follows:

1. A process for gasifying an aqueous sludge containing organic waste solids, comprising the steps of:
    dewatering the sludge containing organic waste solids to a solids content of at least 35% by weight;
    at least partially pyrolyzing the dewatered sludge to produce pyrolysis products;
    gasifying the pyrolysis products after pyrolysis by exposing the pyrolysis products in the absence of oxygen to microwave radiation to produce uncombusted fuel gas and char;
    separating the uncombusted fuel gas and char;
    recovering the uncombusted fuel gas; and
    combusting the char for process heat.

2. A process for gasifying solid organic waste matter, comprising:
    introducing organic waste matter into a reactor;
    generating microwave radiation having a field density of greater than 1,000 watts/cubic foot;
    anoxically exposing the organic waste matter within the reactor to the generated microwave radiation at a temperature of at least 1,800° F. to 2,200° F. to at least partially gasify the organic waste matter to produce uncombusted fuel gas and char; and
    collecting the uncombusted fuel gas and the char from the reactor.

3. The process of claim 2, wherein the organic matter is exposed to microwave radiation having a field density of from greater than 1,060 to 50,000 watts per cubic foot.

4. The process of claim 2, wherein the organic matter is exposed to sufficient microwave: radiation to maintain a temperature within the reactor of from 1,800° to 2,200° F.

5. The process of claim 2, wherein the organic matter has undergone at least partial pyrolysis just prior to introduction into the reactor.

6. The process of claim 2, wherein the organic matter is introduced to the reactor, and the fuel gas and char are collected from the reactor, in a continuous fashion.

7. A process for gasifying solid organic waste matter, comprising the steps of:
    at least partially pyrolyzing the solid organic waste matter to produce pyrolysis products;
    gasifying the pyrolysis products after pyrolysis by exposing the pyrolysis products to microwave radiation to produce uncombusted fuel gas and char; and
    recovering the char and uncombusted fuel gas.

8. The process of claim 7, wherein the step of gasifying comprises exposing the pyrolysis products to microwave radiation having a field density of greater than 1,000 watts)/cubic foot.

9. The process of claim 8, wherein the step of gasifying comprises exposing the pyrolysis products to microwave radiation having a field density of from greater than 1,000 to 50,000 watts/cubic foot.

10. The process of claim 7, wherein the step of pyrolyzing is carried out immediately prior to the step of gasifying.

11. The process of claim 7, wherein the step of pyrolyzing comprises conveying the organic matter through an auger reactor comprising a rotatable auger mounted within a heated casing for transfer of pyrolysis heat to the organic matter.

12. The process of claim 11, wherein the auger and casing cooperatively define a longitudinal axis that is disposed at an incline of from 20° to 70° relative to horizontal.

13. The process of claim 12, wherein the longitudinal axis is disposed at an incline of from 30° to 45° relative to horizontal.

14. The process of claim 12, wherein the step of pyrolyzing comprises pyrolyzing solid organic matter contained in an aqueous sludge.

15. The process of claim 14, wherein a lower portion of the auger of the auger reactor is devoid of an auger flight, creating a plug of organic solid matter around the auger to reduce leakage of gas from the auger reactor.

16. The process of claim 7, wherein the step of pyrolyzing comprises pyrolyzing solid organic matter contained in an aqueous sludge.

17. The process of claim 16, further comprising the step of dewatering the aqueous sludge to a solids content of at least 35% by weight prior to the step of pyrolyzing the sludge.

18. The process of claim 17, wherein the dewatering step comprises dewatering the sludge to a solids content of at least 50% by weight.

19. The process of claim 17, wherein the dewatering step comprises exposing the aqueous sludge to microwave radiation to volatilize water in the sludge.

20. The process of claim 7, further comprising the step of combusting the recovered char to produce process heat.

21. The process of claim 7, further comprising the step of combusting the char to produce vitrified ash.

22. The process of claim 21, wherein the step of combusting the char comprises admixing the char and an oxygen containing gas in a heated cyclonic combustion reactor.

23. The process of claim 7, further comprising combusting the recovered, fuel gas to produce process heat.

24. The process of claim 7, wherein the step of gasifying includes exposing the pyrolysis products to sufficient microwave radiation to maintain a temperature of from 1,800° F. to 2,200° F.

25. The process of claim 7, wherein the step of gasifying is carried out in the absence of oxygen.

26. A system for use in gasifying an aqueous sludge containing organic waste solids, comprising:
- a dewatering unit capable of dewatering the sludge containing organic waste solids as necessary to a solids content of at least 35% by weight;
- a pyrolysis unit in fluid communication with the dewatering unit to at least partially pyrolyze the dewatered sludge to produce pyrolysis products;
- a microwave generator that generates microwave radiation having a field strength of greater than 1,000 watts per cubic foot;
- a gasification reactor in fluid communication with the pyrolysis unit to receive the pyrolysis products;
- a wave guide coupled to the microwave generator and the gasification reactor to expose the received pyrolysis products after pyrolysis to the generated microwaves, producing uncombusted fuel gas and char; and
- a gas/solid separator in fluid flow communication with the gasification reactor for separating the uncombusted gas and the char produced in the gasification reactor.

27. The system of claim 26, further comprising a combustion chamber in fluid flow communication with the gas/solid separator to receive the char and operable in a slagging mode to combust the char to produce vitrified ash.

* * * * *

UNITED STATES PATENT AND TRADEMARK OFFICE
CERTIFICATE OF CORRECTION

PATENT NO. : 6,398,921 B1
DATED : June 4, 2002
INVENTOR(S) : D.P. Moraski

It is certified that error appears in the above-identified patent and that said Letters Patent is hereby corrected as shown below:

Column 9,
Line 55, "1,060" should read -- 1,000 --
Line 57, "microwave: radiation" should read -- microwave radiation --

Column 10,
Line 10, "watts)/" should read -- watts/ --
Line 61, recovered, fuel" should read -- recovered fuel --

Signed and Sealed this

Fourteenth Day of January, 2003

JAMES E. ROGAN
*Director of the United States Patent and Trademark Office*